Jan. 1, 1952     R. S. GRIFFIN     2,580,674
DEVICE FOR DETERMINING THE AXIS OF
ROTATION OF ROTATABLE ELEMENTS
Filed Sept. 29, 1945     2 SHEETS—SHEET 1
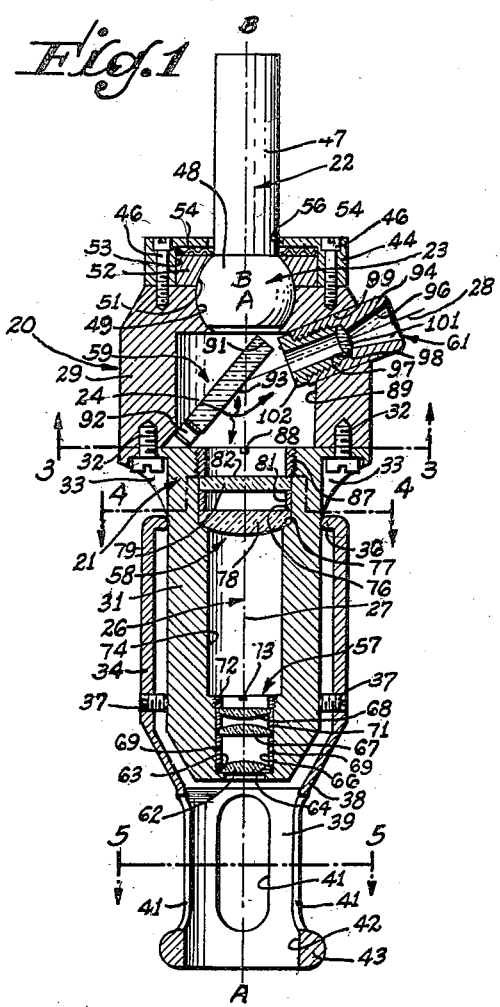
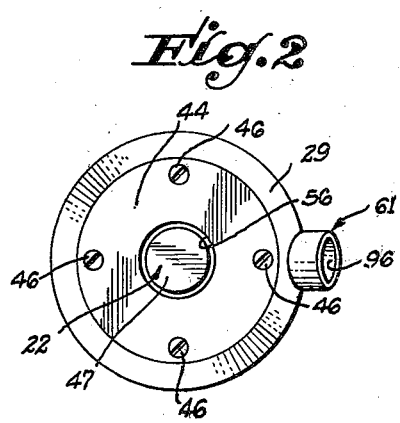
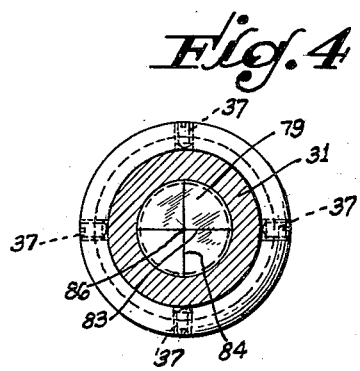
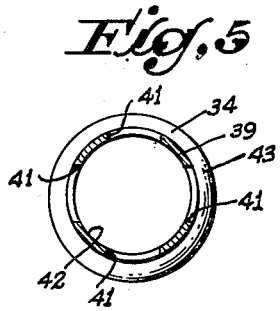
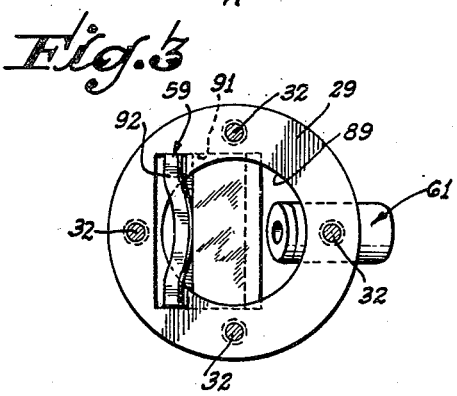
INVENTOR
RICHARD STANLEY GRIFFIN
BY
HARRIS, KIECH, FOSTER & HARRIS
FOR THE FIRM
ATTORNEYS

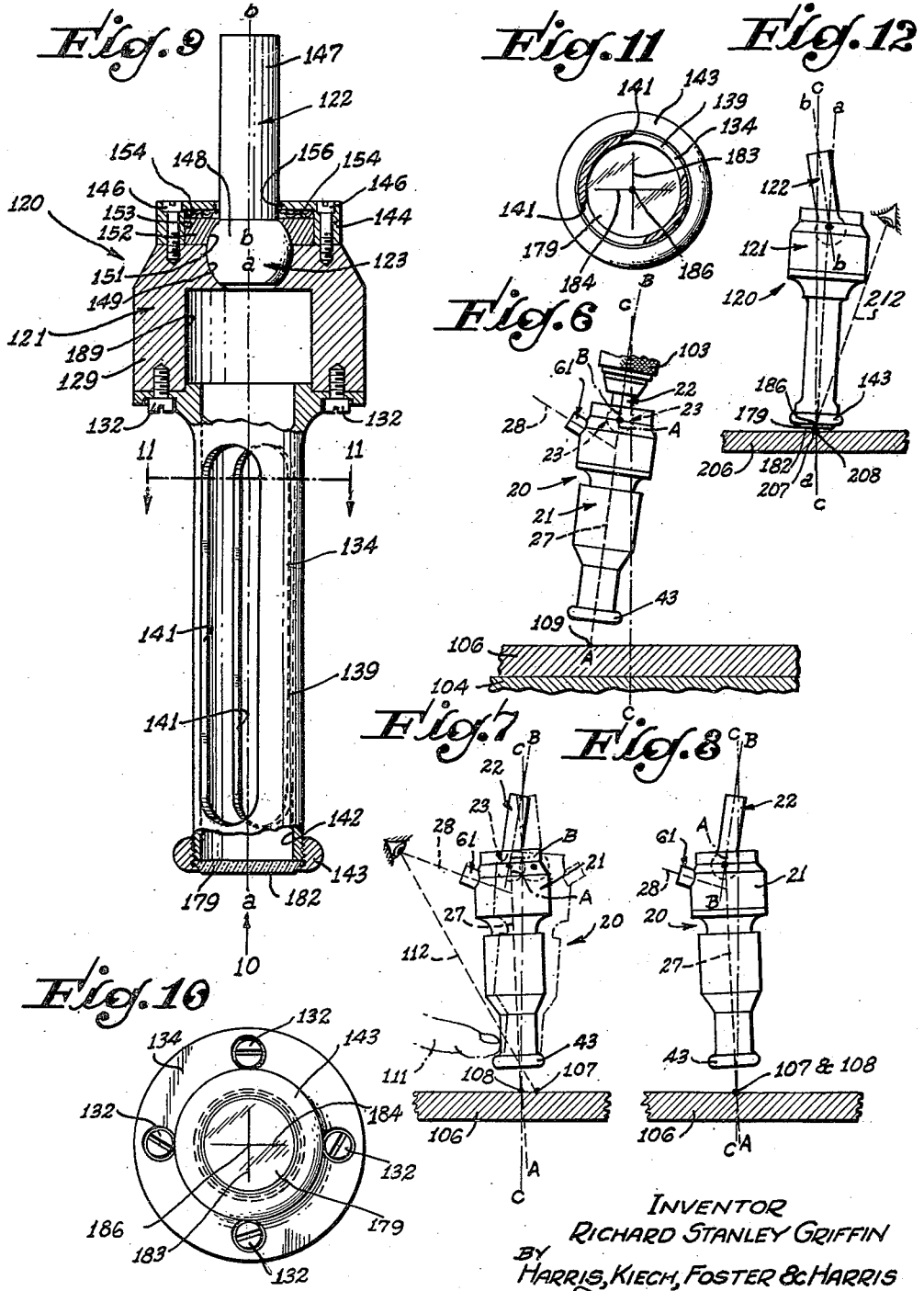

Patented Jan. 1, 1952

2,580,674

UNITED STATES PATENT OFFICE 2,580,674

DEVICE FOR DETERMINING THE AXIS OF ROTATION OF ROTATABLE ELEMENTS

Richard Stanley Griffin, Glendale, Calif.

Application September 29, 1945, Serial No. 619,321

14 Claims. (Cl. 33—46)

My invention relates to a centering device and, more specifically, to a device of this general character which is particularly adapted for determining the precise location of the axis of rotation of a rotary member. The fundamental concepts of my invention are particularly applicable to rotary machine tools and will be considered in connection therewith for the purpose of disclosing the invention with no intention of limiting the scope of the invention thereto, since the principles outlined herein are equally applicable in other fields. These fundamental concepts have been incorporated in certain exemplary embodiments for the purpose of suggesting other embodiments and other applications of my invention to those proficient in the art.

Conventional machine tools, such as a boring mill, drill press, lathe, and the like, are ordinarily provided with a pair of holding means which are rotatable with respect to each other about an operating axis extending therethrough. One of the holding means is adapted to retain an article to be processed by the machine and the other, a tool holding means, is adapted to retain a tool for performing the desired operation. Despite precision manufacturing methods, the longitudinal axis of the rotary holding means seldom coincides with the true axis of rotation thereof, the longitudinal axis generating a surface of revolution about the true axis of rotation, or operating axis. This phenomenon, which is conventionally termed "run-out," may be due to bearing play, warped shafts, and the like, and is magnified by the wear resulting from prolonged use of the machine. Modern machining operations require extremely accurate positioning of the processing tool relative to the article being processed and a machine tool having excessive run-out cannot be employed without determining the precise location of the operating axis thereof, since the magnitude of the run-out may often exceed the permissible manufacturing tolerances for the article being processed.

These aspects of the problem may be graphically exemplified by a consideration of a drill press, a machine tool having a rotary tool holder and a stationary platform adapted to retain an article to be drilled. Any run-out in the rotary tool holder and driving mechanism will cause the tip of a drill retained by the tool holder to describe a circular orbit. In order to locate a hole in the article in an accurate manner, the center thereof must coincide with the exact center of the orbit described by the tip of the drill.

In view of these considerations, a primary objective of my invention is the provision of a centering device for determining the precise location of the operating axis of a rotary member. Another objective of my invention is the provision of a centering device for determining a point on the operating axis of a machine tool whereby a reference point on an article being processed may be made to coincide with the aforesaid point on the operating axis.

An important objective of my invention is the provision of a centering device of this general nature which may be manipulated by an operator of average skill to effect extremely accurate results. I contemplate employing a centering device incorporating an optical system to define a line of sight for locating a point on the operating axis of a rotary member with extreme accuracy. I further contemplate the provision of a centering device adapted for locating a point which is approximately on the operating axis when extreme accuracy is not essential.

A further objective of my invention is the provision of a centering device adapted for defining a line of sight which generates a surface of revolution when the device is attached to an eccentric rotating member, the centering device being operable to vary the configuration of the surface of revolution until the latter defines a cone with its apex on the true axis of rotation of the rotating member. I prefer to effect a realization of this objective by connecting a housing adapted for defining a line of sight and a shank adapted for attachment to a rotary member, the shank being pivotable relative to the housing. The housing may be adjusted until the line of sight generates a conical surface whose walls intersect at a point on the surface of a reference article, the point of intersection being substantially on the operating axis of the rotating shank. The reference article may then be displaced laterally until a reference point thereon coincides with the aforesaid point of intersection.

An additional objective of my invention is to provide a centering device of this character wherein the line of sight, or an extension thereof, extends laterally from the housing to permit lateral observation by an operator. I contemplate the employment of a light reflecting surface in one embodiment of my invention to deflect the line of sight laterally for this purpose, the undeflected, or longitudinal, leg of the line of sight being adapted for generating a right conical surface about the operating axis of the rotating shank.

These and various other objectives and advantages of my invention may be realized by means of the exemplary embodiments thereof shown in the accompanying drawings, which are for illustrative purposes only, wherein:

Fig. 1 represents a longitudinal section through one embodiment of the centering device;

Fig. 2 is a plan view of the embodiment illustrated in Fig. 1;

Figs. 3, 4, and 5 represent transverse sections taken as indicated by the lines 3—3, 4—4, and 5—5, respectively, of Fig. 1;

Figs. 6, 7, and 8 illustrate the operation of the embodiment of Fig. 1;

Fig. 9 is an elevational view, partly in section, of another embodiment of my invention;

Fig. 10 is a plan view taken as indicated by the arrow 10 of Fig. 9;

Fig. 11 represents a transverse section taken along the line 11—11 of Fig. 9; and Fig. 12 is a view similar to Fig. 8 and illustrates the operation of the embodiment shown in Figs. 9 to 11, inclusive.

Referring to the drawings, the embodiment of my centering device illustrated in Figs. 1 to 5, inclusive, is indicated generally by the numeral 20 and includes a cylindrical housing 21 which is connected to a shank 22 by a ball and socket joint 23, the latter being adapted to provide a pivotal interconnection between the housing 21 and shank 22 whereby the angle included by the longitudinal axis A—A of the housing 21 and the longitudinal axis B—B of the shank 22 may be varied. The ball and socket joint 23 is also adapted to permit relative rotation of the housing 21 and shank 22 if desired. Associated with the housing 21 is an optical system 24 for defining a line of sight which is indicated by the broken line 26 and which includes a longitudinal leg 27 and a lateral leg 28, the longitudinal leg 27 preferably being substantially coaxial with the longitudinal axis A—A of the housing 21.

The housing 21 includes a main central section 29 and a coaxial auxiliary central section 31 which cooperate to accommodate the optical system 24 as will be described in detail hereinafter and which are secured together by screws 32 disposed in recesses 33 in the auxiliary central section 31. The latter is partially enclosed by a tubular sleeve 34 having an inwardly-extending annular flange 36 thereon which is in peripheral engagement with the auxiliary central section 31, the sleeve 34 being retained by set screws 37 which also serve to adjust the lateral position thereof relative to the longitudinal axis A—A for reasons to be explained hereinafter. The tubular sleeve 34 is provided with a tapered section 38 which terminates in a cylindrical section 39 having longitudinal slots 41 therein to permit lateral observation through, and to admit light to, a bore 42 in the cylindrical section 39, the latter being provided with an annular bead 43 thereon to permit manipulations of the centering device 20 by an operator in a manner to be explained hereinafter.

The housing 21 also includes a cap member 44 which is secured to the main central section 29 by countersunk screws 46 and which serves to maintain the interconnection between the housing 21 and shank 22. The shank 22 includes a cylindrical stem 47 which terminates in a substantially spherical ball 48, the latter being one component of the ball and socket joint 23. The ball 48 is disposed in a pair of complementary, substantially semi-spherical recesses 49 and 51, the recess 49 being provided in the main central section 29 of the housing 21 and the recess 51 being provided in an adjacent spacing member 52 which is disposed in a complementary bore 53 in the cap member 44. The spacing member 52 is resiliently urged toward the main central section 29 by a suitable compression spring 54 which is disposed in the bore 53 between the cap member 44 and spacing member 52 and which serves to provide a positive but resilient ball and socket joint 23. The stem 47 of the shank 22 extends through an enlarged bore 56 in the cap member 44 which permits the ball and socket joint 23 to function properly to provide the desired pivotal interconnection between the housing 21 and shank 22.

The optical system 24, which is disposed within the main and auxiliary central sections 29 and 31 of the housing 21, includes lens assemblies 57 and 58, a light deflecting means 59, and an eyepiece 61. The lens assembly 57 provides the objective for the optical system 24 and includes a plano-convex lens 62 which is seated against a shoulder 63, the latter being defined by a concentric bore 64 and counterbore 66 which are coaxial with the housing 21. Disposed within the counterbore 66 are additional plano-convex lenses 67 and 68, the lenses 62 and 67 being separated by a tubular spacer 69 and the lenses 67 and 68 by a tubular spacer 71. The lens assembly 57 is retained within the counterbore 66 by a tubular threaded sleeve 72 which is provided with a diametrical groove 73 to permit threaded insertion thereof into the counterbore 66 with a suitable tool.

The counterbore 66 communicates with another concentric counterbore 74, the latter cooperating with a tertiary concentric counterbore 76 to define an arcuate shoulder 77 against which is seated the convex surface of a plano-convex lens 78. Disposed within the counterbore 76 is a plane reticle 79 which is separated from the lens 78 by a tubular spacer 81, a surface 82 of the reticle 79 being provided with cross-hairs 83 and 84. The point of intersection 86 of the crosshair preferably coincides with the longitudinal axis A—A of the housing 21 to cause the longitudinal leg 27 of the line of sight 26 to coincide with the longitudinal axis A—A. The lens assembly 58 is retained within the counterbore 76 by a tubular threaded sleeve 87 which is provided with a diametrical groove 88 therein for convenience of assembly.

The main central section 29 of the housing 21 is provided with a bore 89 which accommodates the light deflecting means 59, the latter being inserted in an oblique slot 91 and retained therein by an arcuate leaf spring 92. The light deflecting means 59 may be of the light reflecting or the light refracting species. As illustrated, the light deflecting means 59 consists of a mirror having a plane light reflecting surface 93, the angle of the reflecting surface 93 relative to the longitudinal axis A—A of the housing 21 being such that the longitudinal leg 27 of the line of sight 26 is deflected toward the eyepiece 61 to define the lateral leg 28, which is preferably coaxial with the eyepiece 61.

The eyepiece 61 includes a tubular member 94 having a frusto-conical bore 96 and an internally threaded, concentric cylindrical bore 97 therein which cooperate to define an annular shoulder 98, the tubular member 94 being frictionally retained within a complementary bore 99 in the main central section 29 of the housing 21. A double convex lens 101 is disposed in the cylindrical bore 97 and is seated against the shoulder 98, the lens 101 being retained by a tubular insert 102 which is threadedly inserted into the bore 97.

The optical system 24 thus provides for lateral observation of an article disposed in the field of vision of the objective 57 adjacent the longitudinal axis A—A of the housing 21. It will be apparent that any desired magnification of the article may be obtained by an appropriate selection of lenses for the optical system 24. Precision manufacture and assembly of the various components of the housing 21 and optical system 24 will result in an optical centering device 20 which may be employed to locate the operating axis of a machine tool with extreme accuracy. The position of the tubular sleeve 34 which encloses the auxiliary central section 31 of the housing 21 may be varied by means of the set screws 37 for the purpose of optically centering the bead 43 relative to the longitudinal leg 27 of the line of sight 26, this centering operation being performed during assembly of the centering device 20 and ordinarily being of a permanent character. It will be understood that various other components of the optical system 24 may also be provided with adjusting means (not shown) for determining the positions thereof if desired, such means being well known in the art.

An exemplary application of the specific embodiment previously described is illustrated graphically in Figs. 6 to 8, inclusive, wherein the shank 22 of the centering device 20 is secured by the chuck 103 of a drill press (not shown). The platform 104 of the drill press sustains an article 106 to be processed, the general objective being to determine the precise location of the operating axis C—C of the drill press relative to a reference point 107 on the article 106 whereby the latter may be displaced until the point 108 at which the line of sight 26 and the operating axis C—C intersect the article 106 coincides with the reference point 107. The latter will then lie on the operating axis C—C of the drill press and thereafter a hole may be bored in the article 106 with complete assurance that the center thereof will coincide with the reference point 107.

Referring to the operation of the centering device 20 in detail, the device is secured to a drill press having an exaggerated amount of run-out for illustrative purposes, the deviation being indicated by the angle included between the true axis of rotation C—C (operating axis) of the drill press and the apparent axis thereof which approximately corresponds to the longitudinal axis B—B of the shank 22. The longitudinal leg 27 of the line of sight 26 intersects the article 106 at some point on the surface thereof, as indicated at 109 of Fig. 6. The drill press is then started and allowed to rotate at a suitable speed (e. g., 200-1000 R. P. M.) to rotate the housing 21 and shank 22, and the operator displaces the housing 21 laterally, as indicated by the thumb 111 of Fig. 7, until the bead 43 rotates only about its own axis. Since the ball and socket joint 23 describes a circular orbit, the longitudinal leg 27 of the line of sight 26 generates a conical surface of revolution whose apex lies approximately in the plane of the surface of the article 106. The apex 108 of the conical surface of revolution generated by the longitudinal leg 27 can be made to lie precisely in the plane of the surface of the article 106, as indicated in Fig. 7, the apex 108 coinciding with the operating axis C—C of the drill press and thus determining the precise location of a point thereon. The drill press is then stopped, and the operator can sight through the slots 41 in an approximate manner, as indicated by the dotted line 112, and displace the article 106 until the reference point 107 approximately coincides with the apex 108. By sighting through the eyepiece 61, the article 106 may be displaced laterally until the reference point 107 precisely coincides with the apex 108 of the conical surface of revolution, the reference point 107 then being exactly on the operating axis C—C as illustrated in Fig. 8. Completion of the centering operation will be indicated to the operator when the point of intersection 86 of the cross-hairs 83 and 84 and the image of the reference point 107 coincide. The centering device 20 may then be replaced by a straight drill with complete assurance that a hole may be bored therewith at the precise location desired.

The alternative embodiment of my invention illustrated in Figs. 9 to 11, inclusive, offers a means for determining the approximate axis of rotation of a rotary member when extreme accuracy is not essential. The latter embodiment is similar to the centering device 20 previously described, except for the omission of a large part of the optical system 24, and numerals have been assigned to the alternative embodiment and the various similar components thereof which correspond to the numerals employed in describing the centering device 20 and differ therefrom by the addition of 100 to the numerals. The reference axes of the centering device 120 are denoted by the letters $a-a$, $b-b$, and $c-c$ which correspond to the axis A—A, B—B, and C—C of the centering device 20. The embodiment 120 includes a housing 121 which is pivotally and rotatably connected to a shank 122 by a ball and socket joint 123 in the manner previously described. The housing 121 includes a central section 129 which is connected to a cap member 144 by screws 146 and which is connected to an auxiliary tubular sleeve 134 by screws 132. The tubular sleeve 134 is provided with a reduced cylindrical section 139 having longitudinal slots 141 therein to permit lateral observation through the interior 142 thereof and is provided with an annular bead 143 thereon which is threadedly connected thereto. The annular bead 143 is adapted to retain a plane reticle 179 which is provided with cross-hairs 183 and 184 on a surface 182 thereof, the cross-hairs 183 and 184 intersecting at 186.

In operation, the centering device 120 is preferably positioned so that the surface 182 of the reticle 179 is in close proximity to an article 206, as illustrated in Fig. 12, to improve the accuracy thereof. The operation of the centering device 120 is similar to the preliminary operation of the device 20 and includes the establishment of a line of sight 212 which passes through the intersection 186 of the cross-hairs 183 and 184 of the reticle 179, the line of sight 212 being similar to the approximate line of sight 112 previously described in conjunction with the description of the operation of the device 20. In order to cause the point of intersection 186 of the cross-hairs 183 and 184 to become stationary when the housing 121 and shank 122 are rotating, the operating axis $c-c$ and the longitudinal axis $a-a$ of the housing 121 must intersect at the point 186 on the surface 182 of the reticle 179. Since the line of sight 212 is coincident with the intersecting point 186 and a reference point 207, the latter will not lie precisely on the operating axis $c-c$, the error being represented by the distance between the reference point 207 and a point 208 which is defined by the intersection of the operating axis c—c with the article 206. The error, which has been exaggerated for illustrative purposes, may be corrected by estimation and may be reduced by decreasing the distance between the surface 182 of the reticle 179 and the article 206 to a minimum. Since the error is equal to the product of the distance between the reticle 179 and the article 206 and the tangent of the angle included by the operating axis c—c and the line of sight 212, it will be apparent that decreasing either the aforesaid distance or angle will reduce the error, the angle being reducible by providing for a line of sight 212 which is more nearly parallel to the operating axis c—c. By minimizing both the aforesaid distance and angle, the error may be reduced to a negligible amount.

My invention thus provides a simple centering means for determining the precise location of a point on the true axis of rotation of a machine tool and may be employed by operators of only ordinary skill to produce extremely accurate results. The centering operation may be performed with a minimum expenditure of time, a consideration of paramount importance in modern manufacturing processes.

The fundamental concepts of my invention are particularly applicable to machine tool operation and various exemplary embodiments and applications thereof have been cited herein for the purpose of disclosing the invention. These basic concepts are equally applicable in other fields and may be incorporated in other embodiments without departing from the spirit of the invention. In view of these considerations, I do not intend to be limited to the specific disclosures contained herein, since those skilled in the art will recognize these and various other applications, substitutions, and modifications of my underlying inventive concept; I hereby reserve the right to all such applications, substitutions, and modifications as properly come within the scope of my appended claims.

I claim as my invention:

1. In a centering device for locating the axis of rotation of a rotatable article, the combination of: a first member adapted to be rigidly connected to the article so as to be rotatable therewith; a second member providing a reference line; cardanic means connecting said second member to said first member and providing a driving connection therebetween, said cardanic means providing for relative pivotal movement between said members in all transverse directions with respect to the axis of rotation of the article and means on said second member and engageable by an operator to restrain said second member during rotation of said members by the article to cause said reference line to generate a conical surface of revolution having its apex on the axis of rotation of the article.

2. In a centering device for locating the axis of rotation of a rotatable article, the combination of: a shank member adapted to be secured to the article so as to be rotatable therewith; a housing member having a longitudinal light opening and a lateral light opening communicating with said longitudinal opening; means for defining a line of sight through said openings; and ball and socket means disposed adjacent one end of said housing member for connecting said housing member to said shank member, said ball and socket means being adapted to transmit rotational movement of said shank member to said housing member and being adapted to permit relative pivotal movement of said members in all transverse directions with respect to the axis of rotation of the article so that said housing member can be restrained during rotation of said members by the article to cause said line of sight to generate a conical surface of revolution having its apex on the axis of rotation of the article at a point adjacent the other end of said housing member.

3. In a centering device for locating the axis of rotation of a rotatable article having a holding means, the combination of: a supporting member receivable by the holding means of the article to render said supporting member rotatable with the article; a housing member having a longitudinal light opening and a lateral light opening communicating with said longitudinal opening; means for defining a line of sight through said openings; and cardanic means permitting relative pivotal movement between said housing member and said supporting member in all transverse directions with respect to the axis of rotation of the article for providing a driving connection between said housing member and said supporting member, whereby said housing member may be restrained during rotation of said members by the holding means of the article to cause said line of sight to generate a conical surface of revolution having its apex on the axis of rotation of the article.

4. A centering device according to claim 3 including an annular bead on said housing member, said bead serving as a manually graspable means for restraining said housing member to cause said line of sight to generate said conical surface of revolution.

5. In a centering device, the combination of: a housing member having a longitudinal light opening and a lateral light opening communicating with said longitudinal opening; means for defining a line of sight through said openings; an annular bead on said housing member adjacent one end of said longitudinal opening; a shank member; means located adjacent the other end of said longitudinal opening and permitting relative pivotal movement between said housing member and said shank member in all transverse directions relative to the line of sight through said longitudinal opening for connecting said housing member to said shank member; and adjusting means for centering said annular bead with respect to said line of sight.

6. In a centering device, the combination of: a housing member having means for defining a line of sight; a shank member; means permitting relative pivotal movement between said housing member and said shank member in all transverse directions relative to the line of sight for connecting one end of said housing member to said shank member; an annular bead on said housing member adjacent the other end thereof; and adjusting means for aligning the center of said annular bead with said line of sight.

7. In a centering device for locating the axis of rotation of a rotatable article having a holding means, the combination of: a shank member receivable by the holding means of the article to render the shank member rotatable with the article; a housing member having a longitudinal light opening and a lateral light opening communicating with said longitudinal opening; means in said housing for defining a line of sight having a longitudinal leg in said longitudinal opening and a lateral leg in said lateral opening, said means including means for deflecting light from said longitudinal opening toward said lateral opening; and cardanic means permitting relative pivotal movement between said housing member and said shank member in all transverse directions with respect to the axis of rotation of the article and providing a driving connection between said members for connecting said housing member to said shank member so that said housing member can be restrained as said members are rotated by the holding means of the article to cause said longitudinal leg of said line of sight to generate a conical surface of revolution having its apex on the axis of rotation of the article.

8. A centering device as set forth in claim 7 wherein said light deflecting means comprises a light reflecting surface disposed at the intersection of said legs of said line of sight, said light reflecting surface being adapted to deflect said longitudinal leg of said line of sight into coincidence with said lateral leg thereof.

9. A centering device as set forth in claim 8 wherein said means for defining said line of sight includes a reticle disposed in said longitudinal opening and having its optical center on said longitudinal leg of said line of sight.

10. In a centering device for locating the operating axis of a machine tool having a rotatable first holding means and having a second holding means adapted to retain an article to be machined, the combination of: a shank member receivable by the first holding means of the machine to provide for rotation of said device with the first holding means; a housing member having means for defining a line of sight which is adapted to intersect the article retained by the second holding means of the machine; means providing relative pivotal movement of said housing member and said shank member in all transverse directions with respect to the operating axis of the machine and providing a driving connection between said members for connecting said housing member to said shank member; and an annular bead on said housing member and engageable by an operator to restrain said housing member during rotation of said device by the first holding means of the machine to cause said line of sight to generate a conical surface of revolution having its apex on the operating axis of the machine at a point substantially on the surface of the article retained by the second holding means of the machine.

11. A centering device as set forth in claim 10 wherein said housing member is provided with a longitudinal light opening and a lateral light opening communicating with said longitudinal opening, said line-of-sight-defining means being adapted to provide a line of sight which extends through said openings.

12. In a centering device for locating an axis of rotation, the combination of: a first member; a second member providing a reference line; means for permitting relative pivotal movement between said members in all transverse directions with respect to the axis of rotation to be located and for providing a driving connection between said second member and said first member so that, by restraining said second member during rotation of said members about the axis to be located, said reference line can be caused to generate a conical surface of revolution having its apex on the axis of rotation to be located; and manually graspable means on said second member and engageable by an operator to restrain said second member during rotation of said members to cause said reference line to generate a conical surface of revolution having its apex on the axis of rotation to be located.

13. In a centering device for locating the axis of rotation of a rotatable article, the combination of: a first member adapted to be rigidly connected to the article so as to be rotatable therewith; a second member having means for defining a line of sight; ball and socket means connecting said second member to said first member, said ball and socket means being adapted to permit relative pivotal movement between said members in all transverse directions with respect to the axis of rotation of the article, and being adapted to transmit rotational movement of the first member to the second member so as to rotate the second member when the first member is rotated by the article; and manually engageable means on said second member and engageable by an operator to restrain said second member during rotation of said members so as to cause said second member to generate a conical surface of revolution.

14. A device as set forth in claim 13 wherein said ball and socket means includes a contractible socket and resilient means for contracting said socket.

RICHARD STANLEY GRIFFIN.

REFERENCES CITED

The following references are of record in the file of this patent:

UNITED STATES PATENTS

| Number | Name | Date |
|---|---|---|
| 357,337 | Rosenblatt | Feb. 8, 1887 |
| 803,435 | Saegmuller | Oct. 31, 1905 |
| 807,857 | Palmenberg | Dec. 19, 1905 |
| 928,477 | Sloggett | July 20, 1909 |
| 940,329 | Krell | Nov. 16, 1909 |
| 1,827,135 | Blake | Oct. 13, 1931 |
| 2,165,024 | Baker | July 4, 1939 |
| 2,186,339 | Moore | Jan. 9, 1940 |
| 2,293,371 | Van Degrift | Aug. 18, 1942 |
| 2,331,160 | Baker et al. | Oct. 4, 1943 |
| 2,366,430 | Benton | Jan. 2, 1945 |
| 2,382,843 | Annis | Aug. 14, 1945 |

FOREIGN PATENTS

| Number | Country | Date |
|---|---|---|
| 559,851 | Great Britain | Mar. 8, 1944 |